United States Patent [19]

Hallamore

[11] 3,775,950
[45] Dec. 4, 1973

[54] PROCESS AIR AUTOMATIC SELF-CLEANING AIR FILTRATION SYSTEM

[76] Inventor: Alfred S. Hallamore, c/o 230 Arvin Ave., P.O. Box 190, Stoney Creek, Ont., Canada

[22] Filed: Apr. 27, 1971

[21] Appl. No.: 137,784

[30] Foreign Application Priority Data
July 6, 1970 Canada .............................. 087350

[52] U.S. Cl. .................. 55/242, 55/273, 55/423, 55/484, 55/502, 134/172, 239/178, 239/225, 239/566
[51] Int. Cl. .................................................. B01d 46/12
[58] Field of Search .................. 55/242, 118, 233, 55/484, 294, 296, 302, 272, 273, 423, 502; 165/4, 5, 8; 134/172; 239/178, 225, 566

[56] References Cited
UNITED STATES PATENTS

| | | | |
|---|---|---|---|
| 1,773,954 | 8/1930 | Coutant ................................. | 165/8 |
| 1,858,508 | 5/1932 | Kignell et al. ........................ | 165/4 |
| 2,197,004 | 4/1940 | Myers ................................... | 55/259 |
| 2,387,473 | 10/1945 | Spitzka ............................ | 55/242 X |
| 2,591,404 | 4/1952 | Carlson ................................ | 55/118 |
| 3,251,175 | 5/1966 | Black, Jr. ............................. | 55/294 |
| 3,407,045 | 10/1968 | Temple ............................... | 23/283 |
| 3,444,670 | 5/1969 | Hungate ............................. | 261/117 |
| 3,664,413 | 5/1972 | Bo ...................................... | 165/5 X |

FOREIGN PATENTS OR APPLICATIONS

| | | | |
|---|---|---|---|
| 13,659 | 0/1913 | Great Britain ....................... | 55/296 |
| 368,492 | 3/1932 | Great Britain ....................... | 55/233 |

*Primary Examiner*—Dennis E. Talbert, Jr.
*Attorney*—Stevens, Davis, Miller & Mosher

[57] ABSTRACT

In a gas filtration system comprising a frame having an upstream side and a downstream side and adapted to support a bank of mechanical filters transversely in a gas stream to remove particulate solids therefrom and means for washing said particulate solids from said filters, the improvement in which said washing means includes isolator means adapted to isolate a portion of said filter bank from passage of gas therethrough and spray means arranged to spray washing liquid on the downstream side of said isolated portion of said filter bank, means being provided for moving said washing means over said bank of filters and means being provided for collecting the washing liquid from the upstream side of the isolated portion of the filter bank and discharging the liquid from the system without said liquid contacting the portions of the bank through which the gas may pass whereby the filter bank may be cleaned during operation of said system.

7 Claims, 8 Drawing Figures

PROCESS AIR AUTOMATIC SELF-CLEANING AIR FILTRATION SYSTEM

The present invention relates to a gas filtration system and usually an air filtration system. In particular, the present invention relates to a gas filtration system in which the particulate solid material filtered by the mechanical filters of the filtration system from the gas flowing therethrough may be washed from the filters during operation of the system thereby avoiding the necessity of closing down the system for cleaning purposes.

As used herein the term mechanical filter means those filters which are comprised of batts or layers of fibrous material and more particularly of batts of synthetic material such as are disclosed in U.S. Pat. Nos. 2,612,966, 2,597,927 and 2,804,937 issued on the 7th of Oct., 1952, the 27th of May, 1952, and the 3rd of Sept., 1957 respectively.

In air cleaning systems, i.e. systems for removing suspended particulate solids from air, it is recognized that mechanical air cleaning systems, i.e. systems involving mechanicals filters are more effective in removing the particulate material from the gas than are more recent sophisticated systems such as electrostatic precipitators. The main advantage with electrostatic precipitators has been their substantially constant resistance to air flow whereas with mechanical systems due to the increase of the solid particulate material in the interstices of the fibrous material, the resistance to flow of air therethrough which inherently is initially greater than with electrostatic precipitators increases greatly during operation of the system and consequently greater maintenance has been required with mechanical systems to remove the filtered solid material from the mechanical filters and this has involved removal of the mechanical filters from the air stream, frequent cleaning of the filters and subsequent replacement. This feature is expensive and in areas where the incidence of suspended particles is high, a greater amount of expense and loss of plant time occurs.

In my Canadian Pat. No. 754,895 issued the 21st of March, 1967, I have disclosed a simple and inexpensive washing unit for use in conjunction with such mechanical filters which washing unit allows the mechanical filters to be washed in situ, i.e. there is no need to remove the mechanical filters for cleaning so that the necessary labour normally employed is obviated and further the cleaning can be effected whenever desired, weekends or whenever necessary by an automatic control system and thus the washing unit permits the down time to be minimized with a minimum of inconvenience. Thus, according to my Canadian Pat. No. 754,895 the air filtration system comprises in combination a bank of mechanical filters, a frame having upstream and downstream sides adapted to support said filters transversely in an air stream, and means for washing each of the filters simultaneously, said washing means comprising an upper horizontal guide track and a lower horizontal guide track, a vertical header assembly extending between said track and horizontally movable therein, unidirectional motor means and continuously operable drive means connecting said motor means and said header assembly to move said header assembly in a first direction and a second reverse direction along said track, said drive means including a first endless chain adapted to be driven by said motor and connected to said vertical header assembly adjacent the top thereof and the second endless chain adapted to be driven by said motor means and connected to said vertical header assembly adjacent the bottom thereof. However, it will be readily seen that with such a filtration system while the cleaning of the mechanical filters is greatly improved it is still necessary with such a washing system to shut down the ventilation system i.e. the fan in order to wash the mechanical filters and allow them to dry. This requirement is in many cases inconvenient and undesirable.

The present invention provides a self-cleaning air filtration system for industrial and commercial air cleaning applications which may be self-cleaning and can automatically regenerate the filtration media in the mechanical filters through a cold water wash without the necessity of shutting down the ventilation system fans. In particular, the air filtration system of the present invention provides for a continuous filtered air flow in air stream while providing the facility of automatically cleaning the filter media of the mechanical filters in place without interruption of the operation of the fans.

It has now been found according to the present invention that by providing in the aforesaid system in combination with a washing means which normally comprises a header including spray nozzles adapted to spray washing liquid e.g. cold water onto the downstream surface of the mechanical filters, an isolator means adapted to isolate a portion of the filter bank from passage of air therethrough and by modifying the spray means such that it is arranged to spray washing liquid on the downstream side of only said isolated portion of the filter bank it is possible to wash a portion of the filter bank, and allow it to dry without stopping the fans and allowing the air flow to pass through the remaining portion of the filter bank. Further, by providing means for moving the washing means including the isolator means over the bank of filters, it is possible to completely clean the whole of the bank of filters in sequential stages and thus by continually operating in this manner it is possible to automatically maintain the bank of filters clean without ever having to stop the ventilation system. It is also necessary that the washing liquid after passage through the mechanical filters when they are contaminated with the solid particulate material should not contact the nonisolated mechanical filters through which air is passing and therefore means are provided for collecting the washing liquid from the upstream side of the isolated portion of the filter bank and discharging the liquid from the system directly from the collecting means.

According to the present invention therefore there is provided in a gas filtration system comprising a frame having an upstream side and a downstream side and adapted to support a bank of mechanical filters transversely in a gas stream to remove particulate solids therefrom and means for washing said particulate solids from said filters, the improvement in which said washing means includes isolator means adapted to isolate a portion of said filter bank from passage of gas therethrough and spray means arranged to spray washing liquid on the downstream side of said isolated portion of said filter bank, means being provided for moving said washing means over said bank of filters and means being provided for collecting the washing liquid from the upstream side of the isolated portion of the filter bank and discharging the liquid from the system without said liquid contacting the portions of the filter bank through which the gas may pass whereby the filter bank may be cleaned during operation of the system.

Suitably the filter bank comprises a plurality of horizontal rows of the mechanical filters, the washing means being adapted to isolate a row of said filters at any particular time from passage of gas therethrough. Thus in operation according to the present invention at any particular time one row of mechanical filters will be isolated from the flow of gas and will be washed and dried according to the present invention and the washing means will move to an adjacent row and perform the same action, whence the gas will pass through the row of mechanical filters which has just been cleaned as well as the other non-isolated portions of the filter bank. The mechanical filters in order to obtain maximum surface area through which the gas must pass are supported in the frame at an angle to the direction of the flow of gas and preferably the mechanical filters are at an acute angle to the horizontal whence said collector means may comprise tray means located below and on the upstream side of the mechanical filters so as to collect the wash liquid passing through the filters under gravity, the wash liquid collected in the tray being then discharged to a discharge duct on the frame and which may be suitably on the side of the frame.

The isolator means of the washing means suitably comprises a panel dimensioned to isolate a row of the mechanical filters and is usually in airtight contact with the upstream side of the frame. The spray means desirably includes a header pipe extending horizontally across the row of filters having a plurality of spaced nozzles therein such that a nozzle will spray one of the mechanical filters and the header pipe is suitably rotatable on a longitudinal axis between two positions so as to direct the spray at different heights onto the mechanical filter. The header pipe is suitably enclosed in a panel member adapted to form an essentially gastight seal with the downstream side of the frame, and suitably the upstream and downstream panels are mounted for movement vertically on the frame by means of wheels. The wash means is suitably moved on the frame so as to isolate different rows of the filter bank by means of a pulley system and suitably the pulley system comprises a first chain attached at one end adjacent the bottom of the downstream panel with the other end attached adjacent the top of the upstream panel, the chain passing around a driven sprocket adjacent the base of the frame and around a first pair of horizontally spaced idler sprockets adjacent the top of the frame, said pulley means also including a second chain attached at one end adjacent the bottom of the upstream panel and at the other end adjacent the top of the downstream panel, said second chain passing around an idler sprocket adjacent the base of the frame and around a second pair or horizontally spaced idler roller sprockets adjacent the top of the frame.

The present invention will be further illustrated by way of the accompanying drawings in which.

Figure 1:
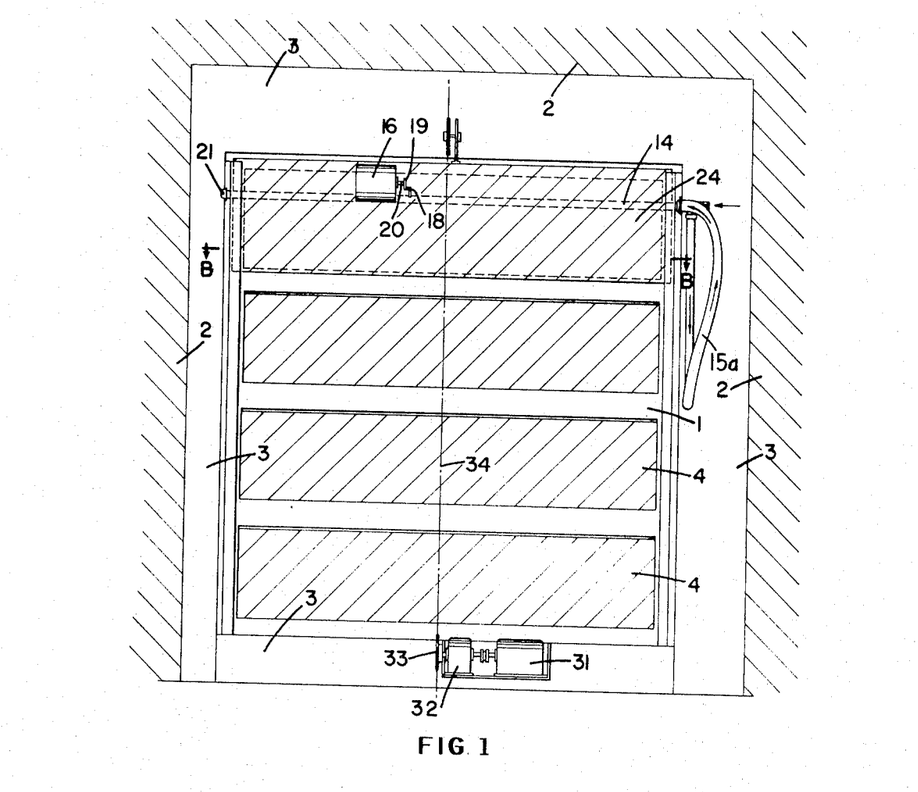
FIG. 1 is an elevation of the downstream end of an air filtration device according to a preferred embodiment of the present invention located in a ventilating shaft.
Figure 2:
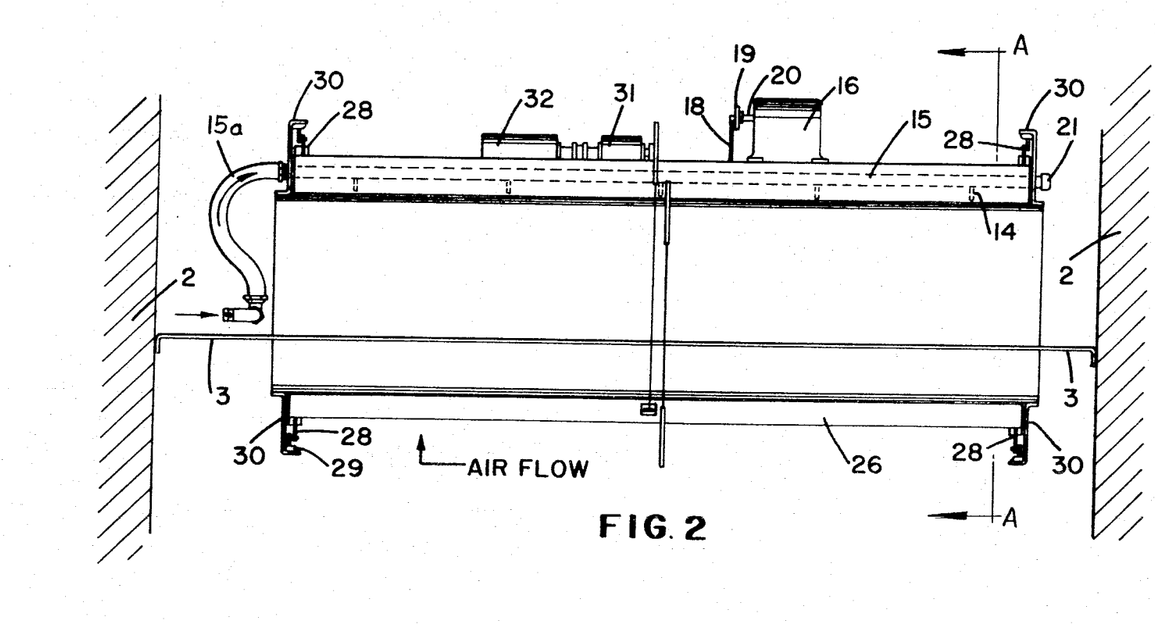
FIG. 2 is a plan view of the device of FIG. 1.
Figure 3:
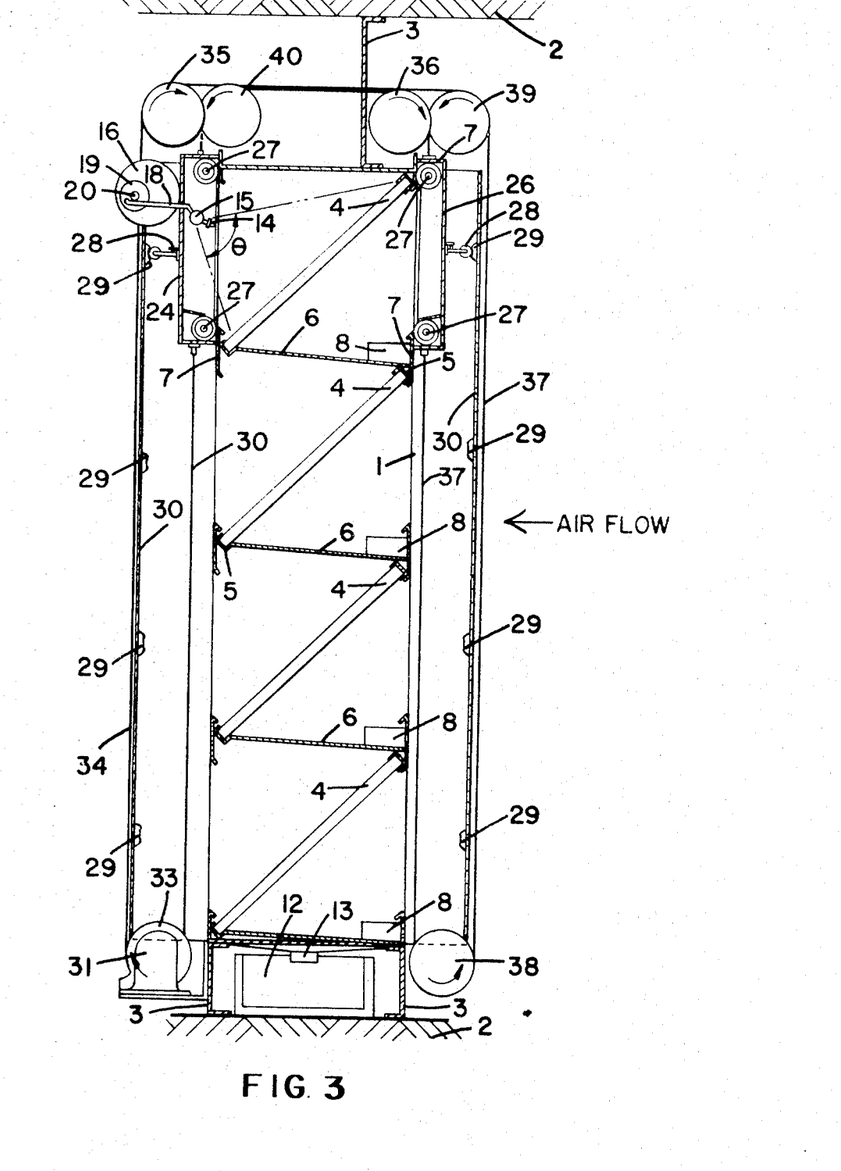
FIG. 3 is a section taken along the line A—A in FIG. 2.

Referring firstly to FIGS. 1–3, the air filtration system which is located in a ventilation shaft 2, and has barriers 3 blocking the space therebetween, comprises a frame 1 which accommodates a plurality of banks of mechanical air filters 4 such that the air filters are disposed at an angle to the flow of air therethrough. The mechanical filters 4 are maintained in position by channels 5 fixedly mounted on trays 6, which trays are fixedly attached to the cross member 7 of the frame 1.

Figure 4:
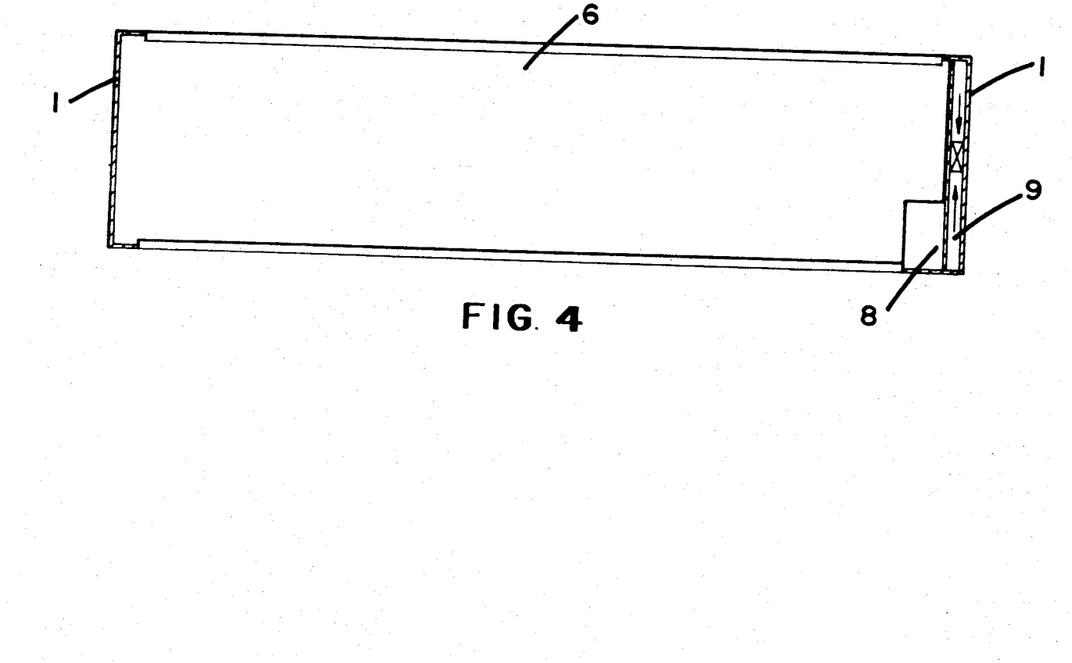
FIG. 4 is a section taken along the line B—B in FIG. 1.
Figure 5:
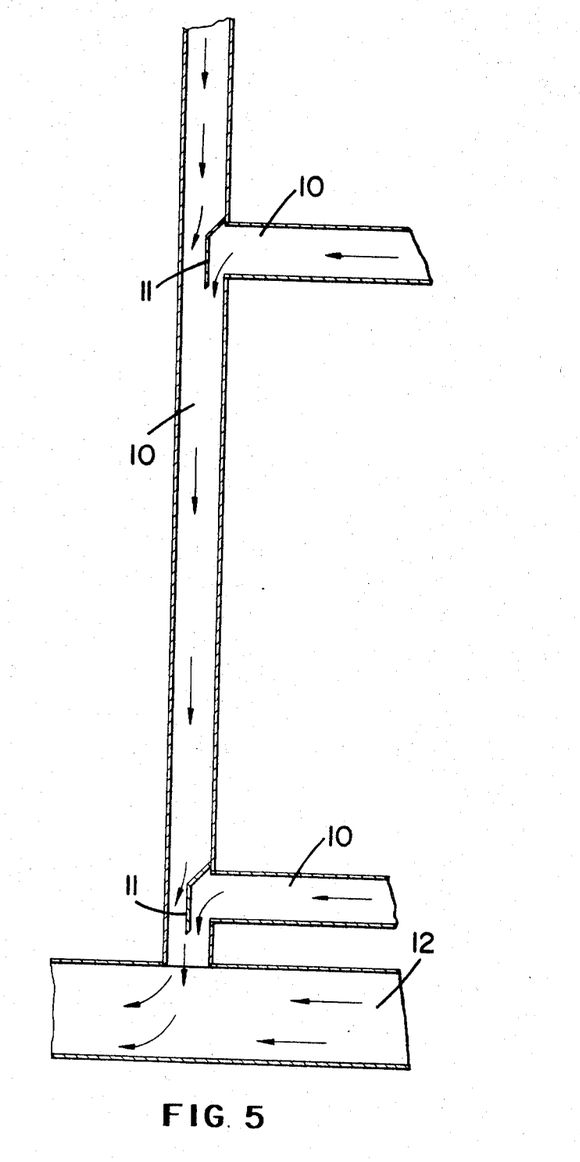
FIG. 5 is a detail of the duct work in the frame for removal of the wash liquid therefrom.

Referring particularly to FIGS. 3–5 wash water passing through the filters 4 is collected in the trays 6 which slant to the upstream end of the system, the wash water being collected from each tray 6 in a collector 8 from whence it passes via a plenum 9 (FIG. 4) and to ducts 10 (FIG. 5) containing baffles 11 in the frame 1 to a drain tank 12 through inlet 13 and from the drain tank 12 the wash liquid is passed to waste.

Figure 6:
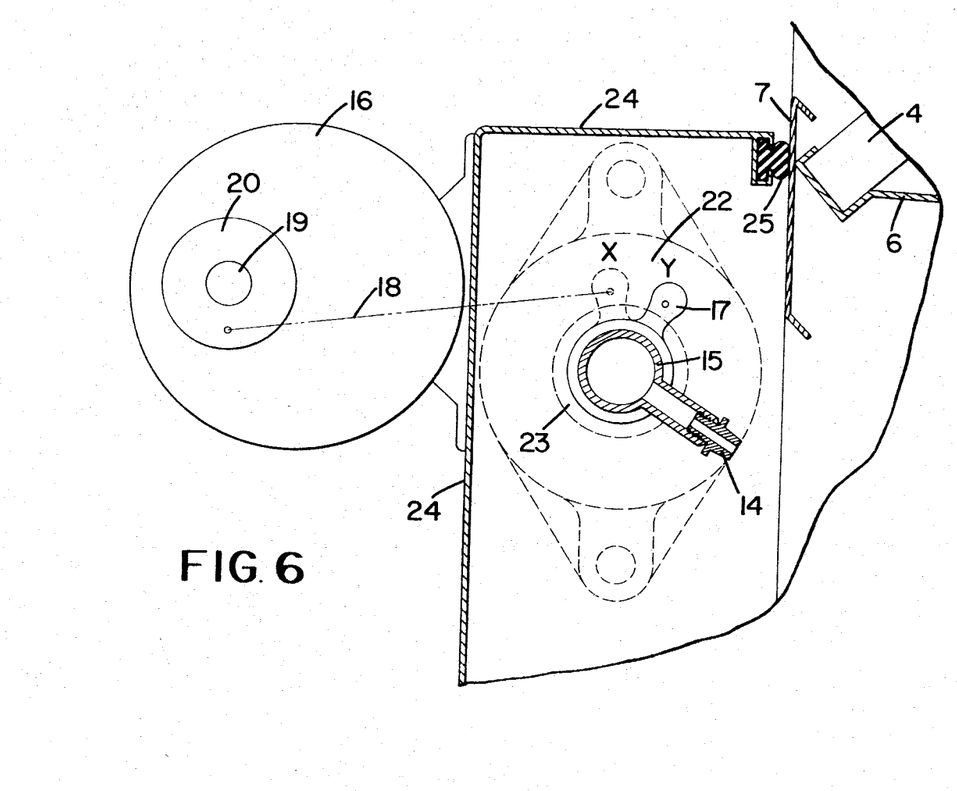
FIG. 6 is a detail partially in section of the header pipe of FIG. 1.

The wash water is sprayed onto the filters 4 from nozzle 14 in a header pipe 15, the wash water being supplied to the header pipe 15 from a flexible hose 15w connected to a supply of water (not shown). The header pipe 15 is mounted for rotation between two positions X and Y (FIG. 6) through an angle $\theta$ (FIG. 1) such that on rotation of the pipe 15 continually between the two positions, the spray of wash water from the nozzles 14 is directed at all levels of the filters 4. Rotation of the header pipe 15 is provided by a motor 16 which moves the lug 17 on the pipe 15 between the positions X and Y via a link 18 connected to the lug 17 and also connected eccentrically on a plate 19 mounted on a shaft 20 from the motor 16.

Figure 7:
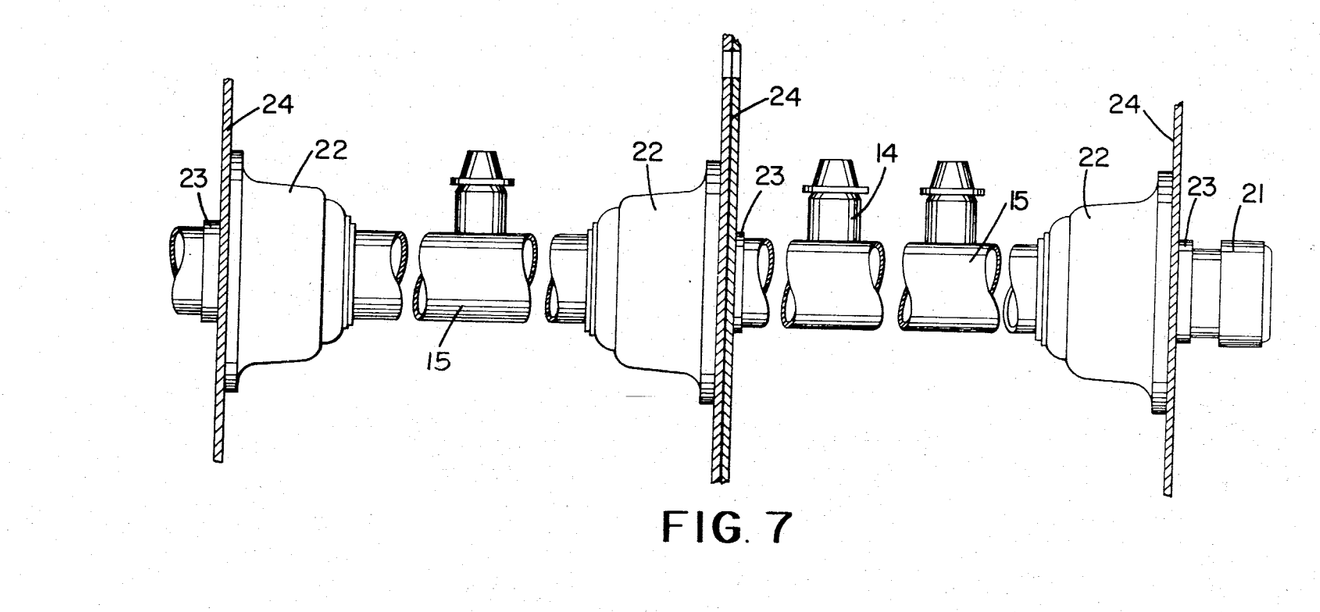
FIG. 7 is a detail of the mounting of the header pipe in FIG. 1.

The header pipe 15 which has a sealing cap 21 at one end thereof is mounted for rotation in bearings 22 including sleeves 23 (FIG. 7). Bearings 22 are in turn mounted on a downstream isolator panel 24 upon which the motor 16 is also mounted. The panel 24 forms a water-tight seal by means of rubber seals 25 with the frame 1 of the filtration system. Opposite the panel 24 and on the upstream side of the frame 1 an isolator panel 26 is located which also has rubber seals (not shown) to form a watertight seal with the frame 1 and thus prevent passage of gas through the top bank of the filters 4 while they are washed with the wash water and subsequently dried.

When the top bank of filters 4 has been washed with the wash water and dried, the panels 24 and 26 are lowered to the next bank of filters 4, the panels running on wheel 27 and the frame 1. In order to maintain a close contact between the rubber seals 25 and the frame 1, i.e. to maintain a water-tight seal between the panels 24 and 26 and the frame 1, a spring loaded roller 28 is mounted at each end of the panel and is arranged to contact a cam 29 and a metal strip 30 at each level of the banks of filters 4.

The vertical movement of the panels 25 and 26 to the different banks of filters 4 is effected from a drive motor 31 operating through a gear reducer 32 to drive a sprocket 33 either clockwise or anticlockwise. Around the sprocket 33 is a roller chain 34 having one end thereof attached to the bottom of the panel 24, the chain 34 passing over sprockets 35 and 36 and having the other end thereof attached to the top of the panel 26. Attached to the bottom of the panel 26 is a lower chain 37 which passes around sprockets 38, 39 and 40 and is attached at the other end thereof to the top of the panel 24. Thus rotation of the sprocket 31 in a clockwise direction as shown by the arrow will cause an anticlockwise rotation of the sprocket 38 as shown by the arrow, and lowering of the panels 24 and 26. Conversely, rotation of the sprocket 31 in an anticlockwise direction will raise the panels 24 and 26.

Figure 8:
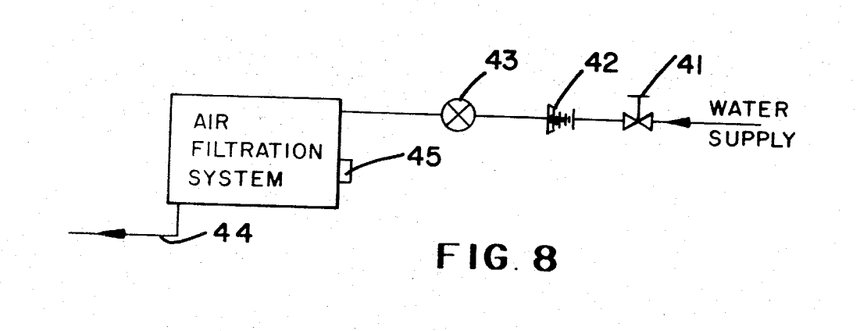
FIG. 8 is a diagrammatic representation of the controls in combination with the air filtration system of FIG. 1.

As shown in FIG. 8, wash water is supplied to the header pipe 15 through line 40 via a gate valve 41 and a line strainer 42 and a solenoid valve 43, the waste wash water exiting from the drain header 44. The air filter system of the presnet invention may be automatically operated by means of a programmed controller mechanism 45.

Thus, in a typical operation, the wash cycle is initiated by a push button or 24-hour 1-7 day clock control. Once initiated the solenoid valve 43 is energized and the spray header oscillator motor 16 is started, allowing a thorough oscillating flush of water onto the bank of filters 4 in the top row. Both isolator panels 24 and 26 are securely pressed to the frame 1 by means of the spring loaded rollers 28 and the cams 29 providing a water-proof sealing of the components. Water is drained from the trays 6 via the collectors 8 in the side of the frame and is dumped into the drain tank 12 at the bottom of the system whence it flows to a drain header. Once a predetermined time has elapsed, the solenoid valve 43 and the motor 16 are stopped, and the filter bank drip dries. Sufficient time is allowed for the entire bank to dry before further sequencing of the system through the controller 45.

On command from the controller 45, the motor 31 is energized, and the following of events takes place. Sprocket 33 turns in a clockwise direction causing the downstream isolator panel 24 to start its downward journey which then permits the upstream isolator panel 26 also to descend. Thus, as the downstream isolator panel 24 descends, it provides successful counterbalancing and accurate parallel displacement of both isolator panels 24 and 26. The downward movement of the isolator panels is terminated by limit switches (not shown) when they are positioned so as to provide isolation of the next lower bank of filters 4 from the flow of air therethrough. The wash-dry sequence as aforesaid is repeated for this bank of filters 4 while the air capacity requirement is satisfied by passage through the filter banks in the non-isolated portions of the system. The sequences of wash, dry and travel are repeated for all the subsequent banks of filters 4 and the controller then returns the isolator panels 24 and 26 to the initial top position without interruption by reversing rotation of the sprocket 33 by the motor 31. The system then remains in this condition until the next scheduled cleaning sequence is required.

The embodiments of the invention in which an exclusive property or privilege is claimed are defined as follows:

1. A gas filtration system comprising a frame having an upstream side and a downstream side supporting a filter bank transversely in a gas stream to remove particulate solids therefrom said filter bank comprising a plurality of vertically disposed horizontal rows of mechanical filter elements disposed at an acute angle to the directon of flow of the gas, means for washing said particulate solids from said filter elements including isolator means comprising an upstream panel dimensioned to isolate a row of said filter elements in said bank from passage of gas therethrough and adapted to form a substantial gas and liquid tight seal with the upstream side of said frame and spray means housed in a downstream panel which panel is adapted to form an essentially gas and liquid tight seal with the downstream side of said frame said upstream and downstream panels including seals in contact with said frame said spray means includng a header pipe extending horizontally across each said isolated row of filter elements and having a plurality of horizontally spaced nozzles therein said pipe being rotatable on a longitudinal axis between two positions such that a washing liquid spray may be directed at different heights on the downstream side of each said isolated row of filter elements, means for rotating said pipe between said two positions comprising a linkage connected adjacent one end thereof to said header pipe and adjacent the other end thereof eccentrically on a plate member arranged to be driven by a drive means, means for linearly moving said wash means vertically and sequentially to each row of filter elements in said bank, comprising a first chain attached at one end thereof to the bottom of the downstream panel and at the other end thereof adjacent the top of the upstream panel, said chain passing around a driven sprocket adjacent the base of the frame and around a first pair of horizontally spaced idler sprockets adjacent the top of the frame and a second chain attached at one end adjacent the bottom of said upstream panel and at the other end adjacent the top of said downstream panel, said second chain passing around an idler sprocket adjacent the base of said frame and around a second pair of horizontally spaced idler sprockets adjacent the top of said frame, means for maintaining said seals between said panels and said frame during washing of each row of filter elements, comprising spring loaded roller means mounted on each panel and arranged to roll along a vertically extending strip during vertical movement of said washing means and to contact cam means of said strip opposite each row of filter elements whereby to increase the pressure of each of said panels on said frame and means for collecting the washing liquid from the upstream side of each isolated row of filters including tray means located below and on the upstream side of each of said rows of filter elements adapted to pass liquid collected therein via a plenum and a discharge duct in said frame, to a drain tank to cause said liquid to be discharged from said system without contacting portions of said system through which gas may pass whereby said filter bank may be cleaned during operation of said system.

2. A gas filtration system comprising a frame having an upstream side and a downstream side and supporting a filter bank transversely in a gas stream to remove particulate solids therefrom said filter bank comprising a plurality of vertically disposed horizontal rows of mechanical filter elements disposed at an acute angle to the direction of flow of the gas, means for washing said particulate solids from said filter elements including isolator means adapted to isolate a row of said filter elements in said bank from passage of gas therethrough and spray means engaged to spray washing liquid on the downstream side of each of said isolated rows of filter elements in said bank, means for linearly moving said washing means vertically and sequentially to each row of filter elements in said bank and means for collecting washing liquid from the upstream side of each of said isolated rows of filter elements said collecting means including tray means located below and on the upstream side of each of said rows of filter elements adapted to pass liquid collected therein to a discharge duct in said frame to cause said liquid to be discharged from said system without contacting portions of said filter bank through which gas may pass whereby said filter bank may be cleaned during operation of said system.

3. A system as claimed in claim 2 in which said collector means comprising tray means located below and on the upstream side of said filter adapted to pass liquid collected therein via a plenum and a discharge duct in said frame to a drain tank.

4. A system as claimed in claim 3 in which the isolator means comprises a panel dimensioned to isolate a row of filters and adapted to be in substantially airtight contact with the upstream side of said frame.

5. A system as claimed in claim 4 in which the spray means includes a header pipe extending horizontally across said rows of filters having a plurality of spaced nozzles therein, said pipe rotatable on a longitudinal axis between two positions such that spray may be directed at different heights on said filters.

6. A system as claimed in claim 5 in which the means for moving the washing means to different rows of said filter comprises a pulley system.

7. A system as claimed in claim 6 in which the spray header is housed in a downstream panel adapted to form an essentially gas-tight seal with the downstream side of said frame and said means for moving the washing means comprises a first chain attached at one end thereof to the bottom of the downstream panel and at the other end thereof adjacent the top of the upstream panel, said chain passing around a driven sprocket adjacent the base of the same and around a first pair of horizontally spaced idler sprockets adjacent the top of the frmae and a second chain attached at one end adjacent the bottom of said upstream panel and at the other end adjacent the top of said downstream panel, said second chain passing around an idler sprocket adjacent the base of said frame and around a second pair of horizontally spaced idler sprockets adjacent the top of said frame.

* * * * *